Figure 4:
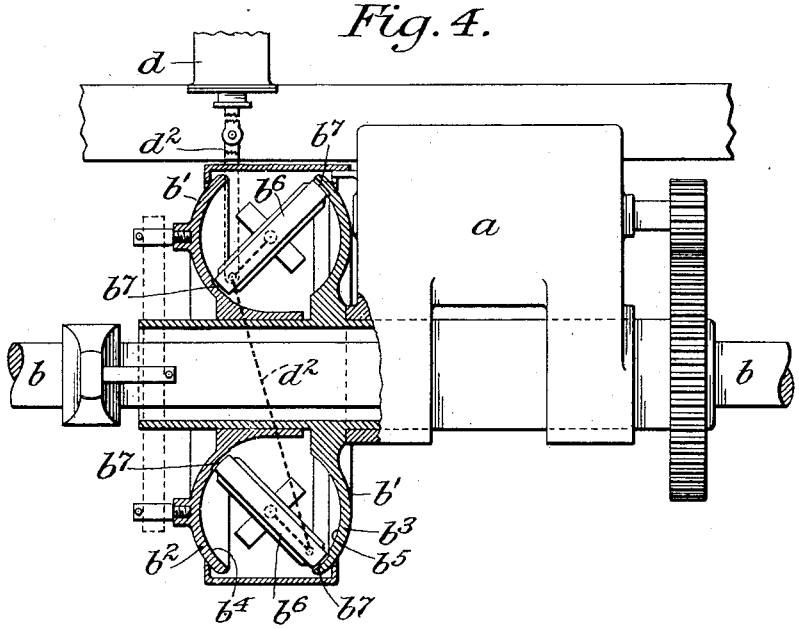

No. 750,550. PATENTED JAN. 26, 1904.
L. LYNDON.
SYSTEM OF ELECTRICAL GENERATION, DISTRIBUTION, AND CONTROL.
APPLICATION FILED JULY 18, 1903.
NO MODEL. 2 SHEETS—SHEET 1.
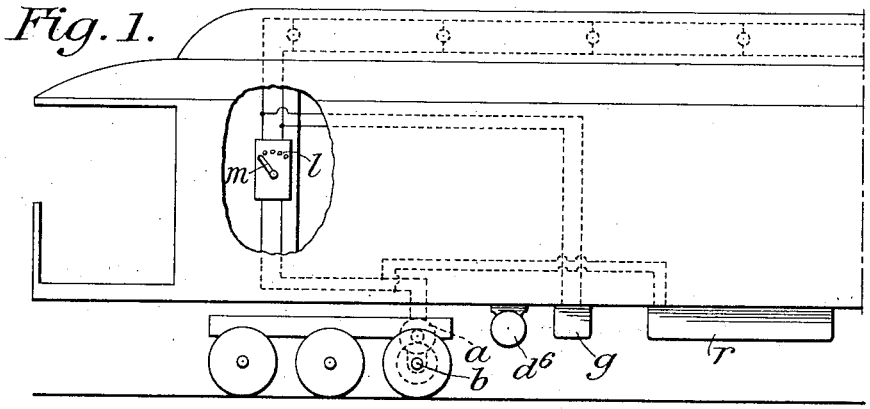
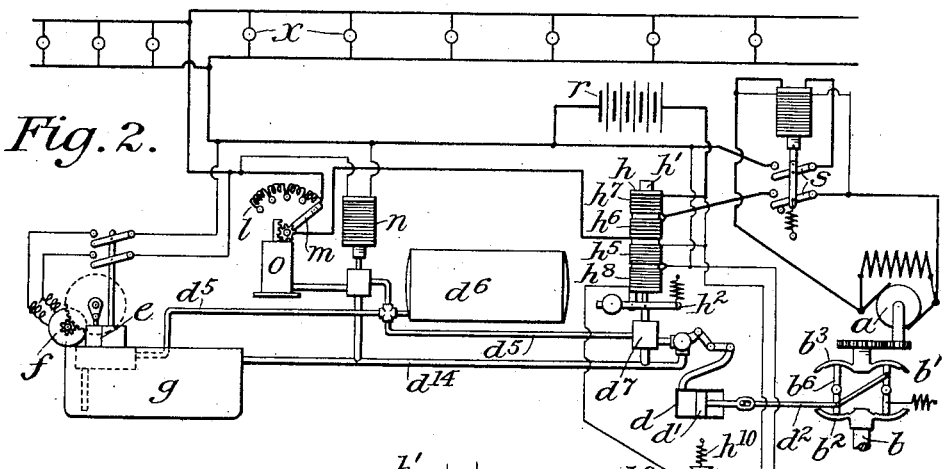
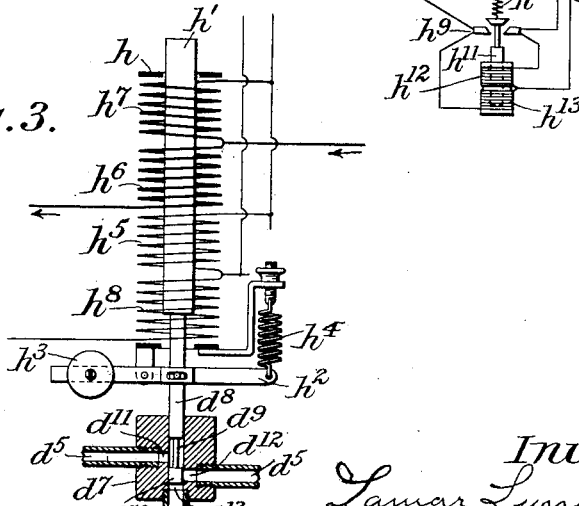

No. 750,550. PATENTED JAN. 26, 1904.
L. LYNDON.
SYSTEM OF ELECTRICAL GENERATION, DISTRIBUTION, AND CONTROL.
APPLICATION FILED JULY 18, 1903.
NO MODEL. 2 SHEETS—SHEET 2.

No. 750,550.       Patented January 26, 1904.

UNITED STATES PATENT OFFICE.

LAMAR LYNDON, OF NEW YORK, N. Y., ASSIGNOR TO NATIONAL BATTERY COMPANY, OF JERSEY CITY, NEW JERSEY, AND BUFFALO, NEW YORK, A CORPORATION OF NEW JERSEY.

SYSTEM OF ELECTRICAL GENERATION, DISTRIBUTION, AND CONTROL.

SPECIFICATION forming part of Letters Patent No. 750,550, dated January 26, 1904.

Application filed July 18, 1903. Serial No. 166,098. (No model.)

*To all whom it may concern:*

Be it known that I, LAMAR LYNDON, a citizen of the United States, residing in the borough of Manhattan, in the city of New York, in the State of New York, have invented certain new and useful Improvements in Systems of Electrical Generation, Distribution, and Control, of which the following is a specification, reference being had to the accompanying drawings, forming a part hereof.

In the application of Elmer A. Sperry, Serial No. 163,838, filed July 1, 1903, there are described certain improvements upon the systems and apparatus for the generation, distribution, and control of electric current such as are described in prior applications of said Sperry and myself, which improvements are particularly designed to provide for a proper division of the generator-current between the storage battery and the circuit of the translating devices and also to provide for a substantial reduction of the electromotive force of the generator, as by a reduction of its speed, when there is no demand for current, either through the translating devices or the recharging of the storage battery. The present invention relates also to systems of the same general character and is intended to accomplish in a different way the same general objects as those just referred to. It is particularly designed to make the control of the electromotive force of the generator automatic under all conditions which are likely to exist in the operation of the system, making the intervention of an attendant unnecessary so far as concerns the operation of the system under normal conditions, and particularly to make it possible to bring the electromotive force of the generator up to the required maximum without manipulation by an attendant, even though the operation of the generator may have ceased altogether while the storage battery was only partially charged.

A further object also particularly in view has been to provide for the complete cessation of the operation of the generator when current is no longer required, while the resumption of operation is automatic, being governed by the requirements of the system.

The present invention will be more fully described and explained hereinafter with reference to the accompanying drawings, in which it is illustrated and in which, as far as possible, the same reference characters are employed to designate like parts as in the several applications hereinbefore referred to.

Figure 5:
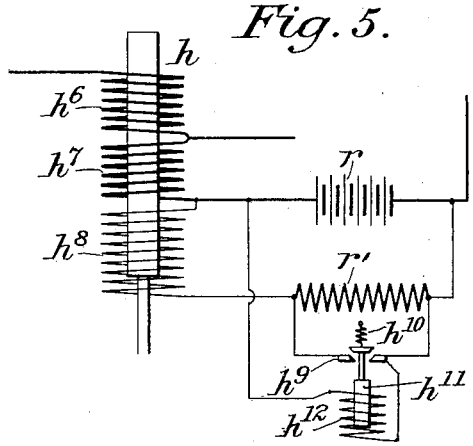

In the drawings, Figure 1 is a view in side elevation, partly broken out, of a portion of a railway-car to which the invention is applied. Fig. 2 is a diagrammatic view illustrating the general relation of the several mechanical and electrical elements of the system. Fig. 3 is a detail view, partly diagrammatic and partly in vertical section, illustrating the electromagnetic devices and the valve operated thereby for controlling the speed of the generator. Fig. 4 is a detail view of the transmitting mechanism. Fig. 5 is a detail view of a modification.

The general features of the system to which the present invention is applied are fully explained in the several applications hereinbefore referred to, and particularly in the application of Elmer A. Sperry and myself, Serial No. 139,399, filed January 17, 1903. Such general features will therefore be referred to herein only so far as mention thereof may be necessary to enable the present invention to be understood.

The generator $a$ may be of any suitable construction and may be arranged to be driven from a variable-speed power source, such as a car-axle $b$, through a transmitting mechanism, such as is indicated at $b'$, which permits the speed, and therefore the electromotive force, of the generator to be regulated as the conditions of the system may require, such a transmitting mechanism being generally shown and described in the application of Elmer A. Sperry, Serial No. 146,281, filed March 5, 1903. As shown in the last-named application, the driving member $b^2$ and the driven member $b^3$ of the transmitting nechanism have their opposed working faces $b^4$ and $b^5$ annularly disposed about the common axis of the two parts and curved each in the arc of a common circle, while power is transmitted from the driver to the driven part through wheels $b^6$, which are in contact with both and are mounted to rotate about axes which lie in planes radial to the axis of rotation of the driver and driven part and are also mounted so that the axis of each wheel may swing in the plane which includes the axis of rotation of the driver and the driven part and the line of contact of each transmitting-wheel with the driver and the driven part be thereby moved to different positions on the curved working face of each. For coöperation with the electrical devices hereinafter described and in order that the operation of the generator may be stopped altogether when there is no demand for current this transmitting mechanism, which in other respects may be the same as described in said application, Serial No. 146,281, is further modified to this extent—namely, that the working face of either the driver or of the driven part, or it may be of both, is cut away in that circular path which would otherwise correspond to the slowest speed of the generator, as indicated at $b^7$ in Fig. 4, so that there shall be no contact between the driver $b^4$ and the transmitting-wheel $b^6$ when the transmitting-wheel has been shifted to the corresponding position under the control of said electrical devices and the transmission of power from its source to the generator shall thereby cease. As will be explained hereinafter, this relation between the parts of the transmitting mechanism is brought about by the action of such electrical devices at a time when the condition of the circuit is such that no current is required, and the operation of the generator may then be stopped altogether or the electromotive force of the generator be otherwise reduced to zero until such time as more current is required, when through the action of the same devices the transmitting-wheel will again be shifted to be brought into operative relation with the driver or the driven part, or both, as the case may be.

It is unnecessary to explain in detail herein any particular mechanical devices for shifting the transmitting-wheels $b^6$, such devices being fully described in said application, Serial No. 146,281, and it will be sufficient for present purposes to state that such transmitting-wheel may be operatively connected by suitable linkage (sufficiently represented at $d^2$) with a piston $d'$ in a cylinder $d$, to which fluid-pressure under control of the electrical devices is admitted to vary the position of the piston in the cylinder, and therefore the position of the transmitting-wheels with relation to the driver and the driven part. A suitable system of pipes $d^5$ and $d^{14}$, with a pressure-reservoir $d^6$ in communication therewith, is provided for the delivery of the air, oil, or other fluid under pressure to the cylinder $d$ and the return of the fluid to its source of supply, which may be a pump $e$, driven by a motor $f$ in circuit with the generator or with a storage battery, hereinafter referred to. An electromagnetic device (represented at $h$ in Fig. 2 and shown in detail in Fig. 3) is provided for the control of the pressure in the cylinder $d$, and therefore for the control, through the medium of the variable-speed power-transmitting device $b'$ or other device of suitable character, of the electromotive force of the generator. This electromagnetic device, which is preferably in the form of a solenoid, has its several windings in circuit, as hereinafter described. The core $h'$ thereof is statically balanced, being connected by a lever $h^2$ with a counterweight $h^3$ and with an adjustable spring $h^4$, which opposes the pull of the solenoid upon the core. The core of the solenoid controls a valve $d^7$, interposed in the pipe system, by means of which the admission of oil to the cylinder $d$ is regulated and by which the oil in the cylinder may be in part released and permitted to return to the oil-pan $g$. As shown, the valve comprises a plug or stem $d^8$, turned down, as at $d^9$, to form a passage between the head $d^{10}$ and the body of the valve. The valve-chamber has a port $d^{11}$ communicating with the pressure-tank, a port $d^{12}$ communicating with the cylinder $d$, and a port $d^{13}$ communicating with the oil-pan through the return-pipe $d^{14}$. The valve is shown in its normal position, the port $d^{12}$ being closed. In the arrangement shown in the drawings the core will be pulled downward by an increase of the magnetic pull of the solenoid against the tension of the spring $h^4$, so that the head $d^{10}$ of the valve will be moved to establish communication through the channel $d^9$ between the port $d^{11}$ and the port $d^{12}$, thereby permitting more oil to pass into the cylinder $d$, which acts upon the transmitting device $b'$ to reduce the speed of the generator or otherwise to reduce the electromotive force of the generator. If the magnetic pull of the solenoid decreases, the spring $h^4$ will lift the core, thereby moving the valve-plug to establish communication between the port $d^{12}$ and the port $d^{13}$, and so relieving the pressure behind the piston $d'$ in the cylinder $d$ and permitting the transmission mechanism to shift in the proper direction to increase the speed of the generator.

The winding $h^5$ of the solenoid $h$ is included in a shunt across the storage battery $r$, which is arranged to supply current to the lamps or other translating devices when the generator is stopped and to be charged by the generator when the lamps or other translating devices are not in use. A second coil $h^6$ of the solenoid is in series with the generator and the lamps or other translating devices, and a third coil $h^7$ is in series with the generator and the battery $r$. In the arrangement shown the winding of the coil $h^5$ is the same as that of the coil $h^6$, while the coil $h^7$ is wound in the opposite direction. The connection from the generator $a$ is made at a common point of the two coils $h^6$ and $h^7$, so that both of these coils are in series with the generator. The effect of the two coils is therefore cumulative with the effect of the shunt-coil $h^5$ when the current flows from the generator; but when current flows from the battery, as when the lights are first turned on, one coil neutralizes the other, leaving the shunt-coil $h^5$ to exert its effect alone upon the core of the solenoid. When the normal generator-current is flowing, the solenoid-core is in its normal position, substantially as represented in Fig. 3, and this condition will exist when the electromotive force of the battery is substantially 2.5 volts per cell (if that is the predetermined maximum) and when the lamp-circuit is open, so that no current is flowing either to the battery through the coil $h^7$ or to the lamp-circuit through the coil $h^6$. If less than the normal generator-current is flowing or if the action of the solenoid is in any other manner decreased, the spring $h^4$, connected to the lever $h^2$, overcomes the pull of the solenoid, so that the valve $d^7$ is operated to relieve the pressure in the cylinder $d$, and thereby through its action on the transmitting mechanism $b'$ the speed of the generator is increased, or the electromotive force of the generator is otherwise increased. In like manner if more than the normal current is flowing or the pull of the solenoid is in any other manner increased the valve $d^7$ is operated to cause a decrease in the speed of the generator. The tendency of the coils $h^6$ and $h^7$ when current flows through them from the generator is to increase the pull of the solenoid, supplementing the action of the coil $h^5$, and thus bringing about a reduction in the speed of the generator; but whether such result takes place or not will depend, of course, upon the current which flows through the several coils. The tendency of the combined effect of the shunt-coil $h^5$ and the battery-coil $h^7$ will be to draw the core $h'$ into the solenoid and reduce the speed of the generator, while if the circuit of the lamps or other translating devices is closed the current from the generator will divide itself between the battery and the lamps, and the tendency of the combined effect of the three coils will also be to draw the core into the solenoid and decrease the speed of the generator. It will be understood that as between the coil $h^7$ and coil $h^5$ the assisting effect of the coil $h^7$ will be an inverse function of the voltage at the terminals of the battery, so that as the voltage of the battery approaches its limit of, say, 2.5 volts the aggregate effect of the coil $h^5$ and the coil $h^7$ will more slowly approach the point at which the core of the solenoid will be moved in opposition to its spring, and the movement of the core will be delayed until the voltage of the battery has reached 2.5 volts per cell. So long as the output of current by the generator is not too great therefore no movement of the core will take place and the speed of the generator will remain unchanged so long as the battery voltage remains unchanged. Any increase of the speed of the generator through an increase in the speed of the car will of course cause an increase of current, a corresponding movement of the solenoid-core, and an immediate regulation of the transmitting mechanism $b'$, which will at once reduce the speed of the generator. The decrease in the speed of the generator will continue until its voltage changes to such a point that the proper current will flow through the coils $h^6$ and $h^7$. As soon as the voltage of the battery reaches 2.5 volts and the generator continues to operate at an unnecessary high speed the tendency of more current to pass through the series battery-coil $h^7$ will immediately act to draw further in the core of the solenoid, and thereby to reduce at once the speed of the generator. In this manner not only is the limit of the battery charge as to voltage fixed, but the delivery of charging-current to the battery is automatically discontinued as soon as the battery is fully charged. If the lamp-circuit is closed when the battery has been fully charged, the flow of current through the lamp series coil $h^6$ will draw in the core $h'$ somewhat and cause the speed of the generator to be decreased slightly until its voltage is reduced to such a point that the battery will tend to discharge itself and the voltage thereof will be reduced to 2.2 volts or less. This decrease of the difference between the battery voltage and the lamp voltage will decrease correspondingly the amount of resistance necessary to be interposed between the generator and the lamp-circuit.

It will be seen that the coöperation of the shunt-coil $h^5$ and the series coil $h^7$ of the solenoid permits the delivery of current to the battery to be decreased as the counter electromotive force of the battery is increased, the battery-charging current becoming very small or practically zero when the requisite voltage of 2.5 volts is reached in the battery. The provision of these two coils only, however, does not provide for a division of the generator-current between the battery and the lamps in a proper ratio, but would permit an excessive amount of current to flow from the generator if the normal current were flowing to the battery and the lamps at the same time were turned on, thus resulting in a burning out of the generator. The addition of series coil $h^6$ in the lamp-circuit causes the generator-current to be divided properly and each circuit—that is, the lamp-circuit and the battery-circuit—to receive its proper proportion of the total current normally delivered by the generator.

The electrical and electromagnetic devices for controlling the electromotive force of the generator thus far described are substantially the same as those described in the application of Elmer A. Sperry, Serial No. 163,838, filed July 1, 1903, above referred to. As in said application, so also in the present case, provision is made whereby the speed or the electromotive force of the generator is reduced when the battery is fully charged and there is no demand for current for lighting or other purposes, as during the day-time. In the present case, however, the means employed are different from those described in said application, and while the result particularly aimed at—namely, the reduction of the speed of the generator—is equally well accomplished the means herein described are of such a character as bring about the normal operation of the generator when the necessity therefor returns under all ordinary conditions and even if it should happen that the train is brought to rest and the operation of the generator stopped when the battery is in an exhausted or partially-exhausted condition. In the present case means are provided for increasing the magnetization of the solenoid $h$, such means being normally inoperative and being dependent for operation upon the voltage of the battery and generator circuit, whereby the additional or supplemental means to increase the action of the solenoid $h$ cannot come into play so long as the battery is even partially exhausted. When, however, the battery has been fully charged to 2.5 volts and there is no longer any demand for current in the circuit of the translating device, then such supplemental means operate to further slow down the generator or reduce the electromotive force thereof until through the device shown in Fig. 4 and fully described hereinbefore the action of the generator is stopped altogether. The supplemental device is thrown out of operation by the reduction of voltage of the battery and generator circuit, and the operation of the generator under normal conditions is therefore resumed as soon as the necessity for the generation of current is renewed.

The increase of magnetization of the solenoid $h$ may obviously be effected in different ways—as, for example, by causing current to flow through additional windings of the solenoid or by causing additional current to flow through the shunt-winding $h^5$. In the arrangement shown in Fig. 3 of the drawings provision is made for passing current through additional windings $h^8$ of the solenoid $h$, such windings being included in a second shunt from the battery through a switch $h^9$, which is held normally open, as by a spring $h^{10}$. The movable member of the switch is carried by the core of a solenoid $h^{11}$, which preferably has two windings, one, $h^{12}$, being included in a shunt from the battery around the switch $h^9$ and the other, $h^{13}$, being included in a shunt from the battery, but passing through switch $h^9$. As above stated, the switch is held normally open, as by the spring $h^{10}$; but the coils $h^{12}$ and $h^{13}$ are of such size and so proportioned that when the voltage of the battery reaches 2.5 volts, at which time the coil $h^5$ reduces the speed of the generator, sufficient current passes through the coil $h^{12}$ of the solenoid $h^{11}$ to close the switch $h^9$ against the tension of the spring $h^{10}$, permitting current to flow across switch $h^9$ and through the coil $h^8$, thereby increasing the magnetization of the solenoid $h$ and further slowing down or reducing the electromotive force of the generator. At the same time current flows through coil $h^{13}$, thereby increasing the pressure on the switch $h^9$ and insuring good contact. The further action of the solenoid $h$ and the consequent increased pressure in the cylinder $d$ moves the piston farther against the opposing spring and throws the transmitting-wheels farther over until they stand in line with the cutaway portion of the working face of the driver $b^4$, thereby bringing about the complete cessation of operation of the generator. The pressure behind the piston remaining constant, the transmitting-wheels will remain in inoperative position until the pressure is relieved through the further action of the solenoid $h$. Whenever the voltage of the battery falls to a predetermined degree, as to two volts per cell, (for which the coils $h^{12}$ and $h^{13}$ are properly proportioned,) the spring $h^{10}$ overcomes the combined effect of the coils $h^{12}$ and $h^{13}$, the switch $h^9$ is opened, current ceases to flow through the coil $h^8$, and the solenoid $h$ is therefore ready to resume its operation under normal conditions. The voltage of the battery having been reduced, as stated, the core of the solenoid $h$ will rise, opening the valve $d^7$ to permit the relief of pressure in the cylinder $d$, and so through the action of the transmitting mechanism or other suitable devices bringing about the increase in speed or electromotive force of the generator.

In the arrangement shown in Fig. 5 the increase of magnetization of the solenoid is effected through the removal of resistance between the battery and the coil $h^8$ of the solenoid $h$. As shown in said figure, the resistance $r'$ is normally included in circuit with the battery and coil $h^8$, the path around the resistance being open at the switch $h^9$, which is controlled by the solenoid $h^{11}$, as already described with reference to Fig. 3. Through the closing of this switch, therefore, resistance is removed from the circuit of the coil $h^8$, and by the increase of current thereby permitted to flow through the coil $h^8$ the magnetization of the solenoid $h$ is increased.

It will be obvious that other changes in detail of construction and arrangement may be made without departing from the spirit of the invention.

I claim as my invention—

1. The combination of a generator, means to regulate the electromotive force of said generator, translating devices in circuit with the generator, a storage battery in parallel circuit with the generator, an electromagnetic device in circuit with the generator to control said regulating means, and means normally inoperative and controlled by the voltage of the battery and generator circuit to vary the magnetization of said electromagnetic device.

2. The combination of a generator, means to regulate the electromotive force of said generator, translating devices in circuit with the generator, a storage battery in parallel circuit with the generator, an electromagnetic device in circuit with the generator to control said regulating means, means normally inoperative to vary the magnetization of said electromagnetic device, and a switch to control said means and operated through a variation in the voltage of the battery and generator circuit.

3. The combination of a generator, means to regulate the electromotive force of said generator, translating devices in circuit with the generator, a storage battery in parallel circuit with the generator, an electromagnetic device in circuit with the generator to control said regulating means, means normally inoperative to vary the magnetization of said electromagnetic device, and an electromagnetic switch to control said means, said switch having a coil included in a shunt from the battery and generator circuit.

4. The combination of a generator, means to regulate the electromotive force of said generator, translating devices in circuit with the generator, a storage battery in parallel circuit with the generator, an electromagnetic device in circuit with the generator to control said regulating means, means normally inoperative to vary the magnetization of said electromagnetic device, and an electromagnetic switch to control said means, said switch having one coil included in a shunt around the battery and a second coil included in a normally open shunt around the battery and adapted to be closed by the closing of the switch.

5. The combination of a generator, means to regulate the electromotive force of said generator, translating devices in circuit with the generator, a storage battery in parallel circuit with the generator, an electromagnetic device to control said regulating means and having two windings in series with the battery and the generator respectively and a shunt-winding and means normally inoperative and controlled by the voltage of the battery to add to the magnetic pull of said shunt-winding.

6. The combination of a generator, means to regulate the electromotive force of said generator, translating devices in circuit with the generator, a storage battery in parallel circuit with the generator, an electromagnetic device to control said regulating means and having two windings in series with the battery and the generator respectively and a shunt-winding, means normally inoperative to add to the magnetic pull of said shunt-winding, and a switch to control said means operated by a variation in the voltage of the battery and generator circuit.

7. The combination of a generator, means to regulate the electromotive force of said generator, translating devices in circuit with the generator, a storage battery in parallel circuit with the generator, an electromagnetic device to control said regulating means and having two windings in series with the battery and the generator respectively and a shunt-winding, an additional winding on said electromagnetic device to supplement the shunt-winding and included in a normally open shunt from the battery, and a switch operated by variations in the voltage of the battery and generator circuit to control said shunt.

8. The combination of a generator, means to regulate the electromotive force of said generator, translating devices in circuit with the generator, a storage battery in parallel circuit with the generator, an electromagnetic device to control said regulating means and having two windings in series with the battery and the generator respectively and a shunt-winding, an additional winding on said electromagnetic device to supplement the shunt-winding and included in a normally open shunt from the battery, and an electromagnetic switch to control said shunt, said switch having a winding included in a shunt from the battery around the normally open contacts of the switch, and a second winding included in a shunt from the battery through the normally open contacts of the switch.

This specification signed and witnessed this 17th day of July, A. D. 1903.

LAMAR LYNDON.

In presence of—
ANTHONY N. JESBERA,
LUCIUS E. VARNEY.